United States Patent [19]
Kane

[11] Patent Number: 6,095,197
[45] Date of Patent: Aug. 1, 2000

[54] PIPE COUPLING STIFFENER

[75] Inventor: William L. Kane, Somonauk, Ill.

[73] Assignee: Cascade Waterworks Manufacturing Co., Inc., Yorkville, Ill.

[21] Appl. No.: 09/416,153

[22] Filed: Oct. 11, 1999

[51] Int. Cl.$^7$ ..................................................... F16L 57/00
[52] U.S. Cl. ........................ 138/96 R; 138/110; 138/115; 138/117; 138/157
[58] Field of Search ................................. 138/96 R, 96 T, 138/97, 98, 110, 114, 115, 117, 155, 157, 158

[56] References Cited

U.S. PATENT DOCUMENTS

| | | | |
|---|---|---|---|
| 1,474,822 | 11/1923 | Hauf | 138/165 |
| 2,143,480 | 1/1939 | Gunderman | 139/96 T |
| 2,156,221 | 4/1939 | Kahn et al. | 138/96 T |
| 2,196,454 | 4/1940 | Kahn et al. | 138/96 T |
| 2,324,181 | 7/1943 | Tulien | 138/165 |
| 2,474,062 | 6/1949 | Murphy | 138/165 |
| 2,825,431 | 3/1958 | Molt | 138/157 |
| 4,379,471 | 4/1983 | Kuenzel | 138/165 |
| 4,630,646 | 12/1986 | Koehle | 138/96 T |
| 5,351,720 | 10/1994 | Maimets | 138/98 |

FOREIGN PATENT DOCUMENTS 2715837 10/1978 Germany .............................. 138/96 R

OTHER PUBLICATIONS

Romac Industries, Inc. Advertisements for "Stiffening Inserts," Dated Jan. 1, 1997.
"Style '501–H' Couplings," Dated Mar. 1, 1995.

*Primary Examiner*—James Hook
*Attorney, Agent, or Firm*—Emrich & Dithmar

[57] ABSTRACT

A pipe coupling stiffener is adapted for insertion in each open end of first and second pipes being connected in a sealed manner in a water or sewer line for reinforcing the pipe connection without affecting flow characteristics of a medium carried by the connected pipes. The pipe coupling stiffener includes a generally cylindrical member open at both ends and having a slot extending the length thereof, where the slot is defined by first and second spaced inner edges with the first edge extending transversely relative to opposed ends of the cylindrical member, while the second edge is oriented at a non-transverse angle to form a single-tapered slot. The pipe coupling stiffener further includes a single-tapered wedge adapted for tight-fitting insertion in the cylindrical member's lengthwise slot. The wedge includes curvilinear outer and inner plates having the same curvature as the cylindrical member and an intermediate plate disposed between and attached to the outer and inner plates. The lateral edges of the outer and inner plates extend beyond the opposed lateral edges of the intermediate plate forming a first tapered edge slot and a second untapered edge slot in opposed lateral edges of the wedge, with the second angled edge of the cylindrical member adapted for insertion in the tapered edge slot and the first transverse edge of the cylindrical member adapted for insertion in the second untapered edge slot of the wedge with each inner edge inserted in a corresponding slot.

11 Claims, 2 Drawing Sheets

PIPE COUPLING STIFFENER

FIELD OF THE INVENTION

This invention relates generally to sealed connections between fluid carrying pipe sections and is particularly directed to a pipe coupling stiffener arrangement for reinforcing the connection between coupled pipe sections without affecting the flow characteristics a medium carried by the coupled pipe sections.

BACKGROUND OF THE INVENTION

High density polyethylene (HDPE) pipe is increasingly being used in fluid carrying lines such as for water and sewer service. HDPE is replacing more conventional pipe materials such as steel, cast iron and asbestos cement because of its lower cost, lighter weight and ease of installation. Because of the lower strength of HDPE pipe, connections between HDPE pipe sections must be reinforced to prevent damage to and leakage from the pipe.

One approach to reinforcing the connection between HDPE pipe sections is shown in the partially cutaway perspective view of FIG. 1. In FIG. 1, a flanged coupling adapter 10 connects a first pipe section 12 to a second, adjacent pipe section 29. The flanged coupling adapter 10 includes first and second end rings 14 and 20. The first end ring 14 includes a generally circular aperture through which the first pipe section 12 is inserted, while the second end ring 20 includes a second generally circular aperture 20a through which the second pipe section 29 is inserted in the direction of arrow 31. A first gasket (not shown for simplicity) is disposed between and engages the first pipe section 12 and the first end ring 14. Similarly, a second gasket 28 is disposed on the inner aperture 20a of the second end ring 20 and engages the second pipe section 29. Flanged coupling adapter 10 further includes four connecting bolts 18a, 18b, 18c and 18d inserted through respective pairs of aligned apertures within the first and second end rings 14, 20. A nut is disposed on the end of each of the four connecting bolts 18a, 18b, 18c and 18d for securely coupling the first and second end rings 14, 20. In FIG. 1, nuts 22a, 22c and 22d are shown threadably engaging bolts 18a, 18c and 18d, respectively. A cylindrical center ring 16 is disposed within and extends between the first and second end rings 14, 20. Center ring 16 is further concentrically disposed about adjacent ends of the first pipe section 12 and the second pipe section 29 and encompasses the juncture between these two pipe sections. For illustrative purposes, center ring 16 is shown partially cutaway as having an aperture 16a therein. In actual use, center ring 16 forms a full cylinder about adjacent ends of the two joined pipe sections. Tapered portions of the flanged coupling adapter 10 form a tight-fitting seal about the two joined pipe sections when the nut and bolt combinations connecting the first and second end rings 14, 20 are securely tightened.

The prior art pipe coupling arrangement shown in FIG. 1 further includes a pipe stiffener 24 inserted within the adjacent open ends of each of the first and second joined pipe sections. An exploded perspective view of the pipe stiffener 24 inserted within the open end of the first pipe section 12 is shown in FIG. 2. A similar pipe stiffener is inserted in the adjacent open end of the second pipe section 29, although this is not shown in the figures for simplicity. Stiffener 24 is generally cylindrical in shape and includes opposed first and second open ends, with the first open end shown in FIG. 2 as element 24a. Extending the length of the stiffener 24 is a tapered slot defined by first and second opposed, inner tapered edges 24b and 24c. An end lip 24d is disposed about the first open end 24a of the pipe stiffener 24 and limits the extent of insertion of the pipe stiffener in the open end of a pipe and affords a high strength portion of the stiffener for pounding the stiffener into an open pipe end such as with a hammer.

Pipe stiffener 24 further includes a dual-tapered wedge 26 having first and second opposed, tapered edges 26a and 26b. Attached to the first tapered edge 26a are a first set of spaced connecting tabs, or clips, 30. Similarly, attached to the second tapered edge 26b are a second set of spaced connecting tabs 32. Each of the aforementioned connecting tabs includes a respective slot which is adapted to receive one of the inner tapered edges of the pipe stiffener 24. Thus, a slot within each of the first set of connecting tabs 30 is adapted to securely engage the first inner tapered edge 24b of the pipe stiffener 24, while a slot in each of the second set of connecting tabs 32 is adapted to securely engage the second inner tapered edge 24c of the pipe stiffener. With the pipe stiffener 24 inserted within the open end of the first pipe section 12, dual-tapered wedge 26 is inserted within the tapered slot in the pipe stiffener such that each connecting tab engages an inner tapered edge of the pipe stiffener. The dual-tapered wedge 26 is then firmly positioned within the pipe stiffener 24 by striking the wider end of the pipe stiffener having end lip 24d with a rubber hammer so that it extends the length of the pipe stiffener within the tapered slot therein. The lead-in end of the tapered slot within the pipe stiffener 24 includes first and second cut-out portions 34a and 34b respectively disposed on tapered edges 24c and 24b. These cut-out portions 34a, 34b allow wedge 26 to be inserted in the lengthwise slot in the pipe stiffener 24, but weaken the strength of the stiffener arrangement.

While the pipe connecting arrangement of FIGS. 1 and 2 operates reasonably well, it has several shortcomings. For example, the dual-tapered wedge 26 requires a tapered roller for its fabrication which increases the cost of the pipe stiffener. In addition, each of the first and second sets of connecting tabs 30, 32 must be precisely positioned on opposed tapered edges of the wedge 26 to securely engage the opposed tapered inner edges of the pipe stiffener 24. This also increases the cost and complexity of manufacturing the pipe stiffener. In addition, connecting tabs 30, 32 extend into the flow path of the medium carried by the coupled pipes and disturb the flow characteristics of the medium. Finally, because proper positioning of the dual tapered wedge 26 within the tapered slot in the pipe stiffener 24 requires precise positioning of the connecting tabs on the wedge, inserting the wedge so that its wider end is flush with the end lip 24d of the pipe stiffener is frequently not feasible, resulting in the wider end of the wedge extending beyond or outside of the end lip of the pipe stiffener. This results in a gap between the coupled pipe ends and makes it more difficult to seal the pipe connection in a leak-proof manner.

The present invention addresses the aforementioned limitations of the prior art by providing a pipe stiffener for securely coupling pipe sections in a sealed manner which is easily fabricated and installed and which does not disturb the flow characteristics of a medium carried by the pipes.

OBJECTS AND SUMMARY OF THE INVENTION

Accordingly, it is an object of the present invention to reinforce the connection between two coupled pipes without affecting the flow characteristics of a medium carried by the coupled pipes.

It is another object of the present invention to provide a pipe coupling stiffener which is easily installed in an open pipe so as to be flush, or aligned, with the end of the pipe for facilitating sealed connection to the end of another open pipe.

Yet another object of the present invention is to facilitate and reduce the cost of manufacturing a pipe coupling stiffener of the type inserted in an open end of a pipe coupled to another pipe and having a cylindrical member with a tapered lengthwise slot and a tapered wedge inserted in the slot.

This invention contemplates a pipe stiffener having a generally cylindrical member open at both ends and including a single tapered edge slot extending the length thereof. The pipe stiffener further includes a wedge having a single tapered edge which is adapted for insertion in the cylindrical member's tapered slot for forming a full cylindrical stiffening insert for insertion in the open end of the pipe. The single tapered edge configuration of the pipe stiffener wedge provides a high strength structure which is easily fabricated and installed in the stiffener's single tapered edge slot. The smooth inner surface of the stiffener's cylindrical member and tapered wedge combination has a minimal affect on the flow characteristics of the medium carried by the connected pipes.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
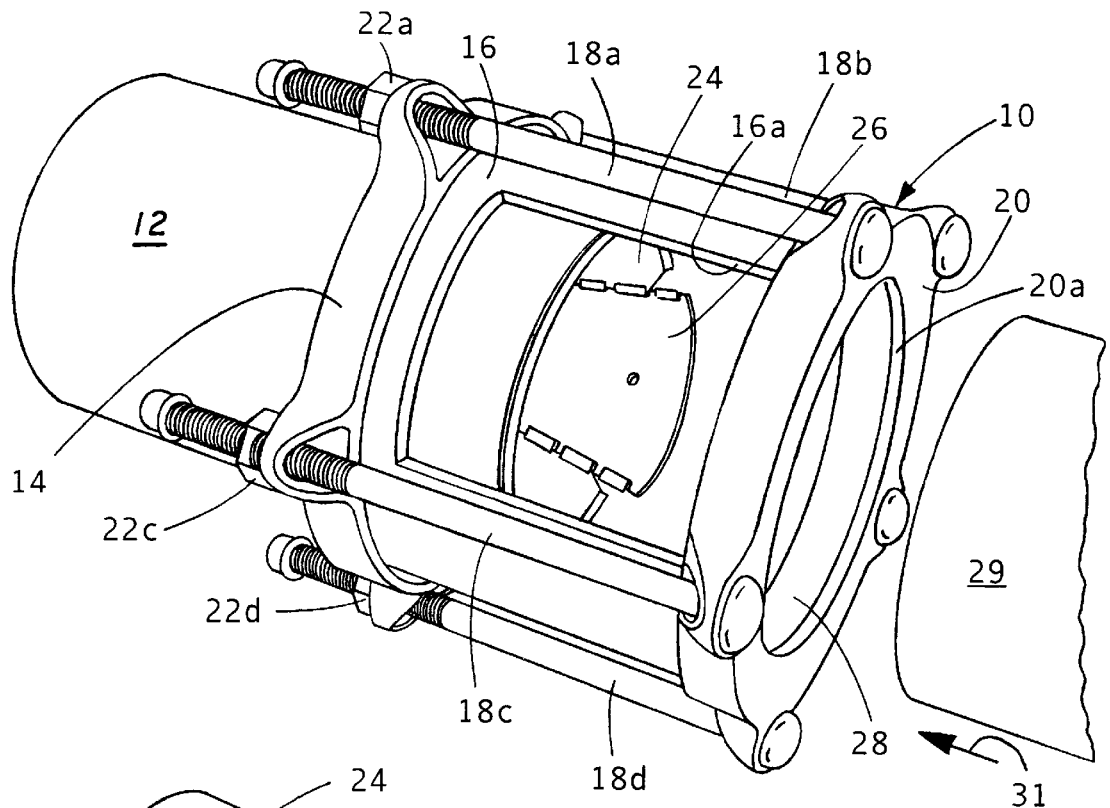
FIG. 1 is a partially cutaway perspective view of a pipe coupling arrangement including a prior art flanged coupling adapter and pipe stiffener.
Figure 2:
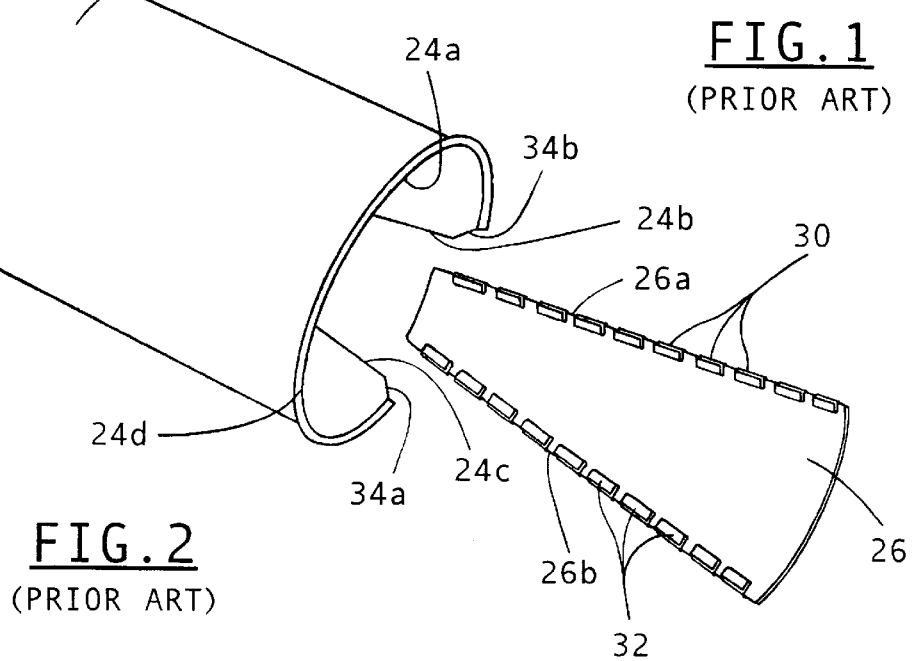
FIG. 2 is an exploded perspective view of the prior art pipe stiffener shown in FIG. 1.
Figure 3:
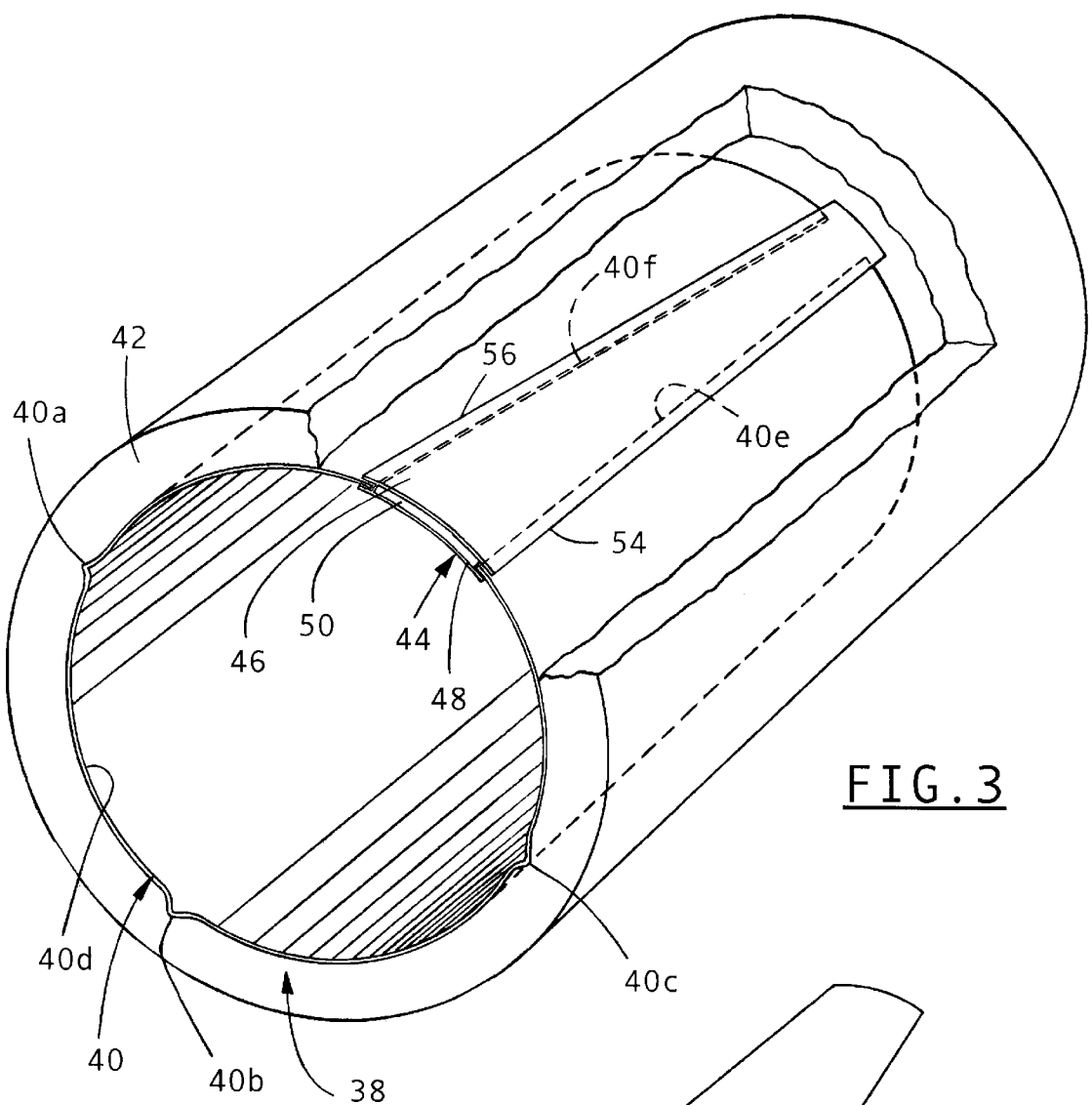
FIG. 3 is a partially cutaway perspective view shown partially in phantom of a pipe stiffener in accordance with the present invention shown inserted in the open end of a first pipe which is to be connected to a second pipe.

Referring to FIG. 3, there is shown a partially cut away perspective view shown partially in phantom of a pipe stiffener 38 in accordance with the present invention shown inserted in the open end of a first pipe 42 which is to be connected to a second pipe (not shown in the figure for simplicity). A similar pipe stiffener would also be inserted in the aforementioned second pipe to form a high strength, rigid reinforced connection between the two pipes, such as comprised of high density polyethylene (HDPE). An arrangement similar to that of the flanged coupling adapter 10 shown in FIG. 1 would be used to connect pipes incorporating the pipe stiffener 38 of the present invention in a sealed manner, although this is not shown in the figure for simplicity. The flanged coupling adapter described above maintains the two coupled pipes in sealed connection, while the pipe stiffener 38 of the present invention provides increased strength and rigidity for the connected pipes.

Pipe stiffener 38 includes a generally cylindrical member 40 which is adapted for lengthwise insertion in the open end of pipe 42. The outer diameter of cylindrical member 40 is such that it engages the inner surface of pipe 42 and is disposed in the pipe in a tight-fitting manner. Cylindrical member 40 includes a first open end 40d and a second, opposed open end which is not shown in the figure for simplicity. Cylindrical member 40 further includes an untapered inner edge 40e and a tapered inner end 40f which are shown in the figure in dotted line form. Untapered inner edge 40e is oriented generally transverse to the opposed open ends of the cylindrical member 40, while tapered inner edge 40e is disposed nontransversely relative to the opposed open ends of the cylindrical member 40. The untapered and tapered inner edges 40e,40f of cylindrical member 40 define a single-tapered slot extending the length of the cylindrical member between its opposed open ends.

Figure 4:
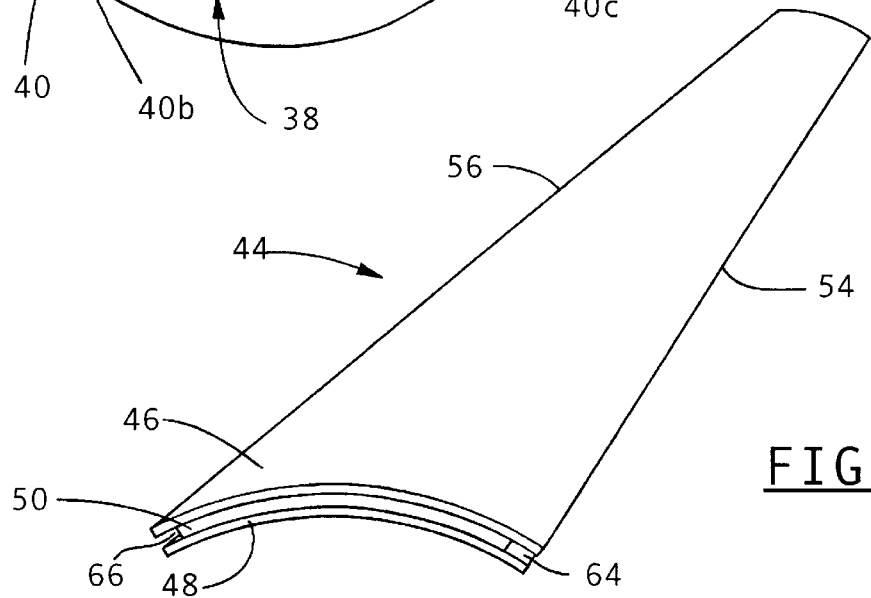
FIG. 4 is a perspective view of the single tapered edge wedge used in the pipe stiffener of the present invention.

The single-tapered slot in the cylindrical member 40 is adapted to receive a single-tapered wedge 44 as shown in FIG. 3. FIG. 4 is a perspective view of the single-tapered wedge 44. Single-tapered wedge 44 is comprised of an outer curvilinear plate 46, an inner curvilinear plate 48, and an intermediate curvilinear plate 50 disposed between the outer and inner curvilinear plates and attached thereto. Each of the aforementioned outer, inner, and intermediate curvilinear plates 46,48 and 50 have essentially the same curvature as cylindrical member 40 and the single-tapered wedge 44 is adapted for tight fitting positioning within the single-tapered slot in the cylindrical member defined by the untapered and tapered inner edges 40e,40f. Cylindrical member 40 and the outer, inner and intermediate curvilinear plates 46,48 and 50 of the single-tapered wedge 44 are preferably comprised of stainless steel. The outer and inner curvilinear plates 46,48 are connected to the intermediate curvilinear plate 50 by conventional means such as spot weldments. The opposed lateral edges of the outer and inner curvilinear plates 46,48 extend beyond the opposed lateral edges of the intermediate curvilinear plate 50 so as to form recessed slots, or notched portions, 64 and 66 on opposed lateral edges of the single-tapered wedge 44 and extending the length of the wedge. The first and second notched portions 64 and 66 are respectively adapted to receive the untapered inner edge 40e and the tapered inner edge 40f defining the single-tapered slot in the cylindrical member 40. Engagement of the untapered and tapered inner edges 40e and 40f of the cylindrical member 40 by the opposed lateral notched portions 64 and 66 of the single-tapered wedge 44 facilitates insertion of the wedge in the single-tapered slot in the cylindrical member and provides a tight fitting, high strength connection between the wedge and the cylindrical member. The cylindrical member 40 and wedge 44 combination have minimal extension into the flow path of a medium carried by the pipes and thus do not disturb the flow characteristics of the medium. The single-tapered wedge 44 is inserted in the slot in cylindrical member 44 by inserting an inner edge of the cylindrical member in an associated lateral notched portion in opposed edges of the wedge. The wider end of the single-tapered wedge 44 is then struck by a rubber hammer or mallet for driving the wedge into the slot in a tight-fitting manner. Disposed about an end of the cylindrical member 40 in a spaced manner are a plurality of crimped portions 40a, 40b and 40c. The spaced crimped portions 40a, 40b and 40c limit the extent of insertion of the cylindrical member 40 into the open end of pipe 42 such that the outer edge of the cylindrical member and the end of the pipe are aligned when the cylindrical member is fully inserted. When the cylindrical member 40 is fully inserted in the open end of pipe 42 such that its first open end 40d is aligned with the end of the pipe, the three crimped portions 40a, 40b and 40c engage the inner surface of the pipe in a tight-fitting manner. In some cases, the outer end of the cylindrical member 40 will have to be struck by a rubber hammer or mallet in order to fully insert the cylindrical member in the open end of pipe 42. The three crimped portions 40a, 40b and 40c are adapted for striking by a rubber hammer or mallet and thus also facilitate installation of the cylindrical member 40 in the open end of pipe 42.

There has thus been shown a pipe coupling stiffener adapted for insertion in each open end of a pair of pipes being connected in a sealed manner in a water or sewer line for reinforcing the pipe connection. Each pipe coupling stiffener includes a generally cylindrical member open at both ends which is inserted in the open end of one of the pipes in a tight fitting manner. The cylindrical member includes a single-tapered slot extending the length thereof between its opposed open ends. Each pipe coupling stiffener further includes a single-tapered wedge adapted for tight fitting insertion in the cylindrical member's elongated, lengthwise slot for forming a full-round reinforcing member disposed in intimate contact with the inner surface of the open end of the pipe. The pipe coupling stiffener is preferably comprised of stainless steel and includes outer and inner curvilinear plates and an intermediate curvilinear plate connected to and disposed between the outer and inner curvilinear plates. The curvilinear plates have the same curvature as the cylindrical member and the single-tapered wedge includes opposed lateral slots, each adapted for receiving in a tight fitting manner a respective inner edge defining the elongated, longitudinal slot in the cylindrical member. This pipe coupling stiffener arrangement facilitates insertion of the wedge into the cylindrical member as well as insertion of the pipe coupling stiffener entirely within the open ended pipe, and also facilitates and reduces the cost of fabrication of the pipe coupling stiffener. The inventive pipe coupling stiffener is particularly adapted for use with high density polyethylene pipe (HDPE).

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. An arrangement for connecting adjacent open ends of first and second pipes in a sealed manner, wherein each of said first and second pipes has a generally circular cross section, said arrangement comprising:
    a flanged coupling adapter having first and second opposed generally circular apertures for receiving the open ends of said first and second pipes, respectively, and for maintaining the open ends of said first and second pipes in sealed contact;
    a generally cylindrical member adapted for insertion in the open end of at least one of said first and second pipes so as to engage an inner surface of the pipe, said member having first and second opposed open ends and a single-tapered slot extending the length of said member between the first and second opposed ends thereof, said slot defined by first and second inner edges of said member, wherein said first and second inner edges are arranged transversely and nontransversely, respectively, relative to the opposed ends of said generally cylindrical member; and
    a wedge inserted in the slot of said generally cylindrical member and including a first untapered edge having a first notched portion extending the length thereof and a second, opposed tapered edge having a second notched portion extending the length thereof, wherein the first inner edge of said cylindrical member is inserted in said first notched portion and the second inner edge is inserted in said second notched portion, and wherein said cylindrical member and said wedge are disposed in intimate contact with the entire circumference of the inner surface of the pipe.

2. The arrangement of claim 1 wherein said first and second pipes are comprised of high density polyethylene and said cylindrical member and said wedge are comprised of stainless steel.

3. The arrangement of claim 1 wherein said wedge includes an inner curvilinear plate, an outer curvilinear plate, and an intermediate curvilinear plate disposed between and coupled to said inner and outer curvilinear plates.

4. The arrangement of claim 3 wherein said inner and outer curvilinear plates extend laterally beyond said intermediate curvilinear plate, and wherein adjacent edges of said inner and outer curvilinear plates form said first and second notched portions on opposed edges of said wedge.

5. The arrangement of claim 1 further comprising a plurality of outwardly crimped portions disposed in a spaced manner on an outer end of said cylindrical member for securely engaging the inner surface of the pipe when said cylindrical member is inserted in the pipe and limiting the extent of insertion of said cylindrical member into the pipe such that their respective outer ends are aligned.

6. The arrangement of claim 1 wherein said cylindrical member and said wedge are disposed in intimate contact and flush with the inner surface of the pipe.

7. A pipe coupling stiffener for strengthening a pair of open ended, connected pipes each having a generally circular cross section, said pipe coupling stiffener comprising:
    a generally cylindrical member inserted lengthwise in the open end of at least one of the pipes, said cylindrical member having first and second opposed open ends and a single-tapered first slot extending the length of said cylindrical member between said first and second open ends, wherein said first slot is defined by a first tapered inner edge and a second untapered inner edge in said cylindrical member;
    a single-tapered wedge having a first tapered lateral edge and an opposed second untapered lateral edge; and
    first and second connecting means respectively disposed on and extending in a continuous manner along the full lengths of said first and second opposed lateral edges of said wedge, wherein said first and second connecting means respectively receive and securely engage in a continuous manner along the entire length of said wedge the first and second inner edges of said cylindrical member.

8. The pipe coupling stiffener of claim 7 comprised of a stainless steel.

9. The pipe coupling stiffener of claim 7 wherein said single-tapered wedge includes an inner curvilinear plate, an outer curvilinear plate, and an intermediate curvilinear plate disposed between and coupled to said inner and outer curvilinear plates.

10. The pipe coupling stiffener of claim 9 wherein said first and second connecting means are each in the form of elongated, linear slots formed from adjacent edge portions of said inner, outer and intermediate curvilinear plates.

11. The pipe coupling stiffener of claim 7 further comprising a plurality of outwardly crimped portions disposed in a spaced manner on an outer end of said cylindrical member for securely engaging an inner surface of said at least one of the pipes when said cylindrical member is inserted in said pipe and limiting the extent of insertion of said cylindrical member into the pipe such that their respective outer ends are aligned.

\* \* \* \* \*

UNITED STATES PATENT AND TRADEMARK OFFICE
CERTIFICATE OF CORRECTION

PATENT NO. : 6,095,197
DATED : August 1, 2000
INVENTOR(S) : William L. Kane

It is certified that error appears in the above-identified patent and that said Letters Patent is hereby corrected as shown below:

COLUMN     LINE 4        13     "40e" should read --"40f"--.

Signed and Sealed this

Seventeenth Day of April, 2001

Attest:

NICHOLAS P. GODICI

Attesting Officer     Acting Director of the United States Patent and Trademark Office